(12) United States Patent
Ritterling

(10) Patent No.: US 7,798,057 B2
(45) Date of Patent: Sep. 21, 2010

(54) COOKING DEVICES

(75) Inventor: Douglas K. Ritterling, Anderson, SC (US)

(73) Assignee: Electrolux Home Products, Inc., Cleveland, OH (US)

( * ) Notice: Subject to any disclaimer, the term of this patent is extended or adjusted under 35 U.S.C. 154(b) by 1032 days.

(21) Appl. No.: 11/388,617

(22) Filed: Mar. 24, 2006

(65) Prior Publication Data

US 2006/0266228 A1 Nov. 30, 2006

Related U.S. Application Data

(60) Provisional application No. 60/664,854, filed on Mar. 24, 2005.

(51) Int. Cl.
*A47J 27/00* (2006.01)
*A21B 1/00* (2006.01)

(52) U.S. Cl. .............................. 99/330; 99/450; 99/339; 99/340; 99/419; 99/421 V; 99/483; 99/444; 99/445; 99/448; 99/449; 126/25 R; 126/9 R; 219/395; 219/386; 219/403; 219/404; 426/523; 426/466

(58) Field of Classification Search .................. 99/339, 99/340, 419–421 V, 483, 444–450; 126/25 R, 126/9 R; 219/395, 386, 403, 404; 426/523, 426/466

See application file for complete search history.

(56) References Cited

U.S. PATENT DOCUMENTS

| 2,584,187 A | 2/1952 | Crist |
| 2,693,750 A | 11/1954 | Badenoch |
| 2,815,707 A | 12/1957 | Morrow |
| 3,019,720 A | 2/1962 | Topper |
| 3,263,593 A | 8/1966 | Appleman |
| 3,289,664 A | 12/1966 | Hewitt |
| 3,343,527 A | 9/1967 | Manteris |

(Continued)

OTHER PUBLICATIONS

"TEC Sterling g-2000 gas grill islands", www.outdoorditchensdepot. com/tec-sterling-g2000-grill-islands.asp, copyright 2001, 5 pages.

(Continued)

*Primary Examiner*—Shawntina Fuqua
(74) *Attorney, Agent, or Firm*—Pearne & Gordon LLP

(57) ABSTRACT

A cooking device comprises a cooking surface and a wall structure that extends away with respect to the cooking surface. Examples of the cooking device include a closure configured to be moved with respect to the wall structure from a first position to a second position. Access to the cooking surface is provided when the closure is oriented in the first position and the closure is configured to cooperate with the wall structure to define a cooking chamber when the closure is oriented in the second position. A handle can be attached to the closure, wherein the closure is configured to move from the second position to the first position by moving the handle away with respect to the wall structure. In addition or alternatively, the cooking device may include a rotisserie device with an arm configured to move from a retracted position to an extended position with respect to the wall structure. If provided, a portion of the arm can be positioned within an interior area portion of the wall structure in the retracted position and the portion of the arm can extend outside of the interior area portion of the wall structure in the extended position.

20 Claims, 9 Drawing Sheets

U.S. PATENT DOCUMENTS

| | | |
|---|---|---|
| 3,442,201 A | 5/1969 | Kates |
| 3,665,913 A | 5/1972 | Cagle, Jr. |
| 3,789,822 A | 2/1974 | Schantz |
| 3,866,994 A | 2/1975 | Bonin |
| 4,082,391 A | 4/1978 | Turner |
| 4,106,473 A | 8/1978 | Wandel |
| 4,108,055 A | 8/1978 | Simmons |
| D254,468 S | 3/1980 | Cox |
| 4,321,857 A | 3/1982 | Best |
| 4,895,068 A | 1/1990 | Hanagan et al. |
| 4,996,969 A | 3/1991 | Dodgen |
| 5,031,602 A | 7/1991 | Vick |
| 5,097,817 A | 3/1992 | Dodgen |
| 5,213,027 A | 5/1993 | Tsotsos et al. |
| 5,410,950 A | 5/1995 | Rone |
| 5,419,249 A | 5/1995 | Papandrea |
| 5,536,518 A * | 7/1996 | Rummel .................. 426/523 |
| 6,038,965 A | 3/2000 | Thorndyke |
| D423,280 S * | 4/2000 | Lin ............................ D7/363 |
| 6,131,505 A | 10/2000 | Lin |
| 6,248,982 B1 | 6/2001 | Reid et al. |
| 6,308,616 B1 | 10/2001 | Johnson |
| 6,437,291 B1 * | 8/2002 | Hopponen ................. 219/395 |
| 6,508,165 B2 | 1/2003 | Johnson |
| D475,552 S | 6/2003 | Hubert |
| 6,598,514 B2 | 7/2003 | Leggi |
| 6,626,089 B1 | 9/2003 | Hubert |
| D536,206 S * | 2/2007 | Ritterling .................... D7/332 |
| D541,101 S * | 4/2007 | Ritterling .................... D7/332 |
| 2004/0065313 A1 | 4/2004 | Thompson |

OTHER PUBLICATIONS

"TEC Sterling G3000 Grill Islands", www.outdoorkitchensdepot. com/tec-sterling-g3000-grill-islands.asp, copyright 2001, 5 pages.
"TEC Sterling G4000 Grill Islands", www.outdoorkitchensdepot. com/tec-sterling-g4000-grill-islands.asp, copyright 2001, 5 pages.
"TEC Sterling II Grill Islands", www.outdoorkitchensdepot.com/ tec-sterling-II-grill-islands.asp, copyright 2001, 4 pages.
"TEC Sterling III Grill Islands", www.outdoorkitchensdepot.com/ tec-sterling-III-grill-islands.asp, copyright 2001, 4 pages.
Design U.S. Appl. No. 29/226,098, filed Mar. 24, 2005.
Design U.S. Appl. No. 29/226,099, filed Mar. 24, 2005.
Design U.S. Appl. No. 29/226,102, filed Mar. 24, 2005.
Design U.S. Appl. No. 29/226,155, filed Mar. 24, 2005.

* cited by examiner

COOKING DEVICES

CROSS-REFERENCE TO RELATED APPLICATION

The present invention claims the benefit of U.S. Provisional Application No. 60/664,854 filed Mar. 24, 2005, the entire disclosure which is herein incorporated by reference.

FIELD OF THE INVENTION

The present invention relates to cooking devices, and more particularly to cooking devices including a closure and/or a rotisserie device.

BACKGROUND OF THE INVENTION

Cooking devices are commonly used to cook food items for consumption. Such cooking devices are known to include pivoting doors to selectively close a cooking chamber. Providing a closed cooking chamber can be beneficial to enhance flavor of the food items, increase the environmental cooking temperature and/or retard flames. After one side of the food items have been sufficiently cooked, the door is typically pivoted opened to flip or otherwise move the food items on the grill surface. Pivoting the door typically involves grasping a handle in front of the cooking device and pulling upwards to open the cooking chamber of the cooking device. The user continues to move the handle to an upper position wherein the cooking chamber is fully open. Such a pivoting arrangement can expose portions of a user's hands and/or arms to steam and/or hot gases escaping from the cooking chamber as the user moves the handle from the lower position to the upper position when opening the cooking chamber. Cooking devices are also known to include rotisserie devices. Known rotisserie devices may remain exposed when not in use and/or may include exposed components that may be damaged and/or create pinch points or other safety concerns.

SUMMARY OF THE INVENTION

Accordingly, it is an aspect of the present invention to obviate problems and shortcomings of conventional cooking devices.

In accordance with one aspect, a cooking device comprises a cooking surface including a front portion and a rear portion. A wall structure extends away with respect to the rear portion of the cooking surface and a closure is configured to be moved with respect to the wall structure from a first position to a second position. Access to the cooking surface is provided when the closure is oriented in the first position and the closure is configured to cooperate with the wall structure to define a cooking chamber when the closure is oriented in the second position. A handle is attached to the closure, wherein the closure is configured to move from the second position to the first position by moving the handle away with respect to the wall structure.

In accordance with another aspect a cooking device comprises a cooking surface including a front portion and a rear portion. A wall structure extends away with respect to the cooking surface and a rotisserie device includes an arm configured to move from a retracted position to an extended position with respect to the wall structure. A portion of the arm is positioned within an interior area portion of the wall structure in the retracted position and the portion of the arm extends outside of the interior area portion of the wall structure in the extended position.

In accordance with still another aspect, a cooking device comprises a cooking surface including a front portion and a rear portion. A wall structure extends away with respect to the rear portion of the cooking surface. A support base is configured to support the wall structure and cooking surface and a closure is configured to be moved with respect to the wall structure from a first position to a second position. Access to the cooking surface is provided when the closure is oriented in the first position and the closure is configured to cooperate with the wall structure to define a cooking chamber when the closure is oriented in the second position. The closure is configured to move from the second position to the first position by moving an edge of the closure away with respect to an upper portion of the wall structure. A rotisserie device includes an arm configured to move from a retracted position to an extended position with respect to the wall structure. A portion of the arm is positioned within an interior area portion of the wall structure in the retracted position and the portion of the arm extends outside of the interior area portion of the wall structure in the extended position.

BRIEF DESCRIPTION OF THE DRAWINGS

The foregoing and other aspects of the present invention will become apparent to those skilled in the art to which the present invention relates upon reading the following description with reference to the accompanying drawings, in which.

DETAILED DESCRIPTION OF EXAMPLE EMBODIMENTS

Figure 1:
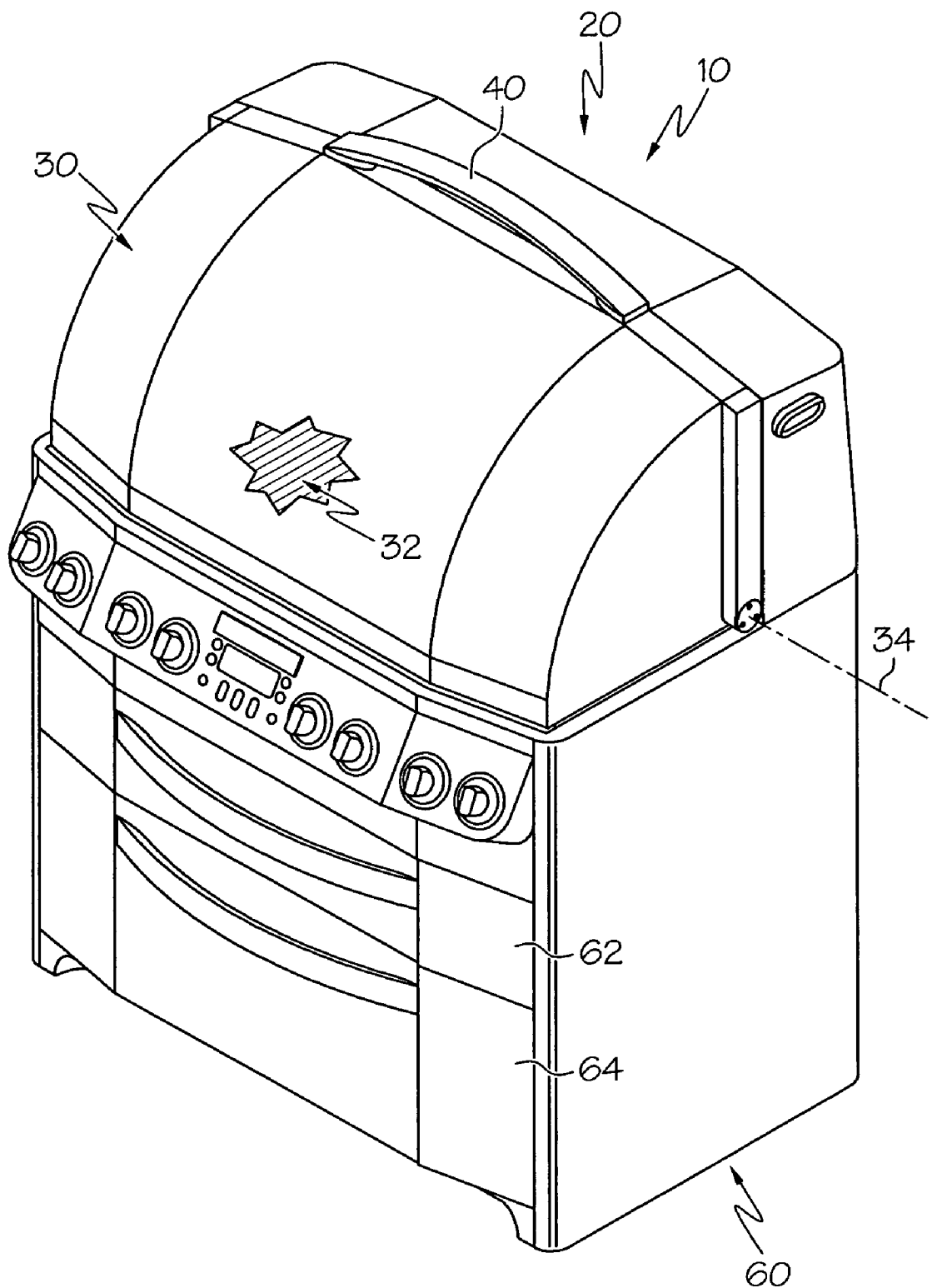
FIG. 1 is a front perspective view of a cooking device in accordance with one example of the present invention wherein a closure is oriented in a second position with respect to a wall structure.

Certain terminology is used herein for convenience only and is not to be taken as a limitation on the present invention. Further, in the drawings, the same reference numerals are employed for designating the same elements.

The figures illustrate one example of a cooking device 10 incorporating aspects of the present invention. The cooking device may comprise a wide variety of structural arrangements and properties permitting a variety of cooking procedures at various cooking locations. In the shown example, the cooking device comprises a gas grill although aspects of the present invention may be incorporated with cooking devices comprising charcoal grills or other cooking arrangements. Moreover, cooking devices may include one or a combination of grills, rotisseries, stoves, skillets, deep fryers or other heating sources configured to perform a function when cooking one or more food items. In addition, or alternatively, it is contemplated that cooking devices in accordance with the present invention may perform other procedures during the overall cooking process. For example, cooking devices may include a pre-cooking device configured to warm one or more food items prior to being cooked. In further examples, cooking devices may comprise post-cooking devices configured to warm or maintain a minimum temperature of one or more food items after performing a cooking procedure.

The illustrated cooking device 10 may be useful for outdoor applications. For example, the cooking device 10 may comprise a stand-alone appliance although further cooking devices may be incorporated in an outdoor barbeque arrangement, and/or other applications. In addition, or alternatively, the cooking device 10 may be used in an indoor application. For example, cooking devices 10 of the present invention may be provided with a hood arrangement, chimney, or other exhaust system configured to permit aspects of the present invention to be used in an indoor kitchen, recreational room, or other indoor and/or outdoor application. In one example, the cooking device 10 may be used as a modular component for an outdoor kitchen. Outdoor kitchens can be useful for a wide range of food preparation applications. For example, outdoor kitchens may be used in a residential setting, a commercial establishment, or other outdoor location.

Figure 2:
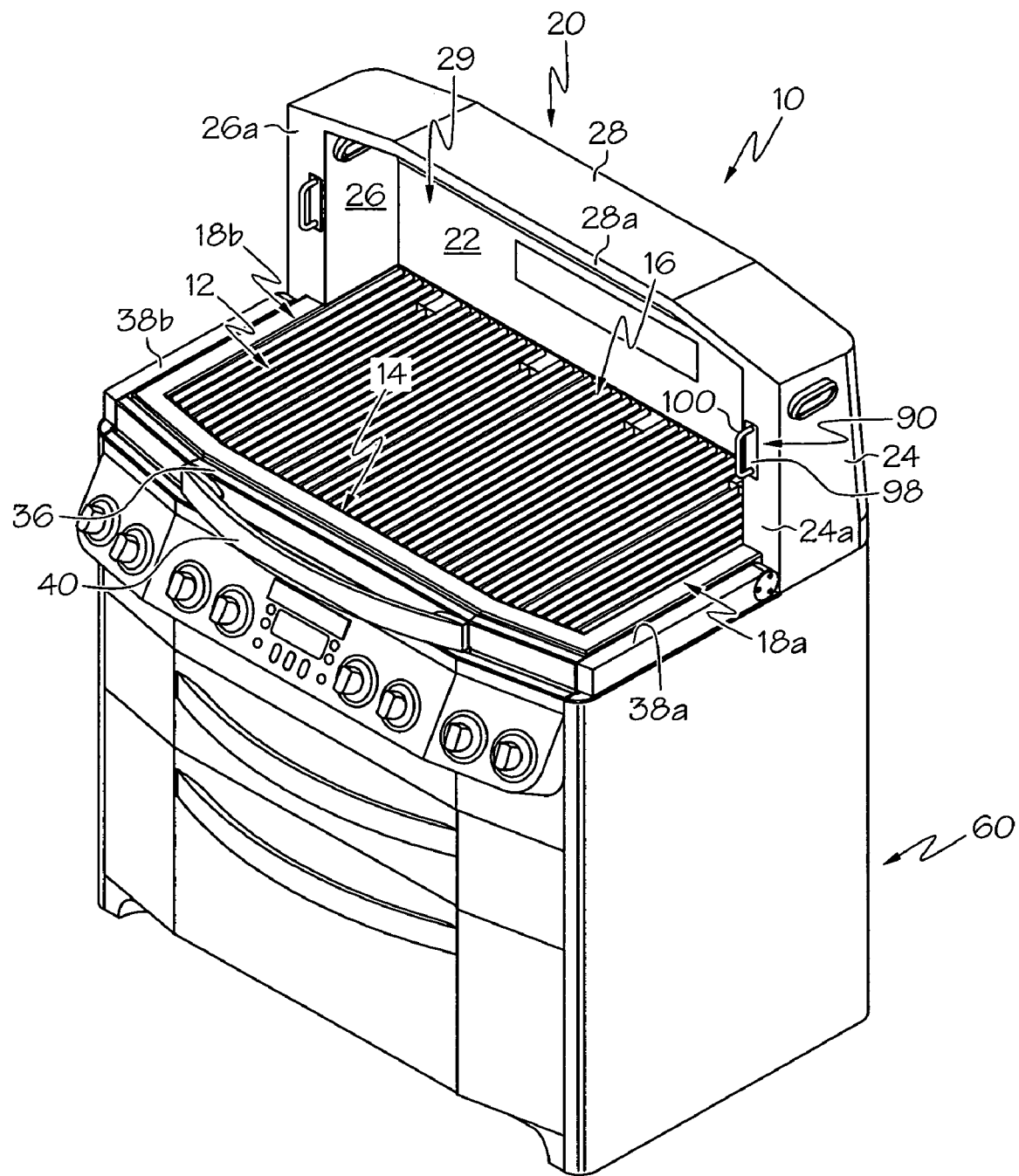
FIG. 2 is a front perspective view of the cooking device of FIG. 1, with the closure oriented in a first position with respect to the wall structure and two arms of a rotisserie device oriented in a retracted position with respect to the wall structure.

As shown in FIG. 2, the cooking device 10 includes a cooking surface 12 with a front portion 14 and a rear portion 16. The illustrated cooking surface 12 comprises a grill arrangement configured to support food items being cooked although other configurations may be provided in other types of cooking devices. For example, the cooking surface may comprise a grate of a stove, a heating plate of a skillet or other surfaces configured to support one or more food items being cooked. In another example, the cooking surface may comprise a liquid bath of a deep fryer. Still further, cooking surfaces may comprise a heat source offset from one or more food items being cooked. For example, the heat source can comprise a heating element configured to provide heat to a rotisserie unit or the like.

As further illustrated in FIG. 2, the cooking device 10 includes a wall structure 20 extending away with respect to the cooking surface 12. In one example, the wall structure 20 extends away with respect to the rear portion 16 of the cooking surface 12. In addition, or alternatively, the wall structure 20 can extend away with respect to a side surface or other portion of the cooking surface 12. For example, as shown in FIG. 2, the wall structure 20 extends away with respect to a rear portion 16 of the cooking surface and portions of the sides 18a, 18b of the cooking surface 12. Although not shown, examples of the cooking device 10 can comprise a wall structure extending away with respect to other areas of the cooking surface. For instance, the wall structure can comprise two support structures extending away with respect to respective opposite sides or with respect to an intermediate portion of the cooking surface. In further examples, the wall structure can comprise a single support structure extending away with respect to one of the sides or with respect to an intermediate portion of the cooking surface.

As further illustrated, the wall structure 20 is located immediately adjacent a rear edge of the rear portion 16 and side edge portions of the sides 18a, 18b while extending away with respect to the cooking surface. In further examples, the wall structure may be offset from the rear and/or sides of the cooking surface such that the wall structure is spaced from the rear and/or sides of the cooking surface while extending away with respect to the rear and/or side portions of the cooking surface.

Wall structures in accordance with the present invention can include a single wall portion or may include a plurality of wall portions. For example, the wall structure can include a single wall portion positioned at various locations while extending away with respect to the cooking surface. In further examples, the wall structure can comprise a plurality of wall portions that extend independently away with respect to the cooking surface. For example, the wall structure can comprise two or more wall portions extending away with respect to the cooking surface at various locations. In the illustrated example, the wall structure 20 comprises a plurality of wall portions connected together. Indeed, the exemplary wall structure 20 can comprise a rear wall portion 22 connecting together a first side wall portion 24, a second side wall portion 26 and a top wall portion 28. As shown, the wall portions 22, 24, 26 of the wall structure 20 can define a cavity 29 extending over the rear portion 16 of the cooking surface 12.

As shown in FIGS. 1 and 2, the cooking device 10 can further include a closure 30 configured to move with respect to the wall structure 20 from a first position (see FIG. 2) to a second position (see FIG. 1). The closure can be configured to move with respect to the wall structure 20 in various ways. As shown, the closure 30 is configured to pivot about a pivot axis 34 between the first position and the second position. Although not shown, it is contemplated that the closure 30 may move with respect to the wall structure 20 in other ways. For example, the closure 30 may translate, pivot and/or rotate with respect to the wall structure when moving between the first and second position. As further shown in the illustrated example, the pivot axis 34 may be fixed although it is contemplated that the pivot axis may be movable in further examples.

The closure 30 may also be provided with an optional counterbalance apparatus to facilitate movement between the first and second position. For example, as shown somewhat schematically in FIG. 6A, the closure 30 may include a torsion spring 37 although other counterbalance structural arrangements may be incorporated in further examples.

As shown in FIG. 2, access to the cooking surface 12 is provided when the closure 30 is oriented in the first position. Access to the cooking surface 12 provided in a wide variety of ways. For example, the closure may be designed to provide access from the front, side, below and/or above the cooking surface 12. In the example illustrated in FIG. 2, the access to the cooking surface 12 is provided from the front and portions of the sides of the cooking surface 12 when the closure 30 is oriented in the first position.

As shown in FIG. 1, the closure 30 is configured to cooperate with the wall structure 20 to define a cooking chamber 32 when the closure is oriented in the second position. The cooking chamber 32 can be designed to enhance flavor of the food items, increase the environmental cooking temperature and/or retard flames. In the illustrated example, the closure 30 includes a front edge 36, a first side edge 38a and a second side edge 38b. In the second position, the first side edge 38a is configured to cooperate with a front surface 24a of the first side wall portion 24 and the second side edge 38b is configured to cooperate with a front surface 26a of the second side wall portion 26. Likewise, the front edge 36 is configured to cooperate with the front surface 28a of the top wall portion 28. In one example, cooperation may include abutment between one or more of the surfaces of the closure 30 and wall structure 20. In further example, the closure 30 and wall structure 20 may cooperate such that the surfaces of the closure and wall structure are spaced from one another. For example, the closure 30 may be configured to have a vent opening when the closure 30 is oriented in the second position. The vent opening, if provided, may be oriented in an upper portion of the cooking chamber to release vapor and hot gases at an upper portion of the cooking device.

As shown in FIGS. 1 and 2, the cooking device 10 can further include a handle 40. If provided, the handle 40 can be attached to the closure 30 such that the closure may be moved from the second position (see FIG. 1) to the first position (see FIG. 2) by moving the handle 40 away with respect to the wall structure 20. In the illustrated example, the handle 40 may be moved away with respect to the wall structure 20 by moving along an arcuate path between a second orientation (see FIG. 1) to a first position (see FIG. 2). The handle can also be moved toward the wall structure in order to move the closure from the first position (see FIG. 2) to the second position (see FIG. 1). Thus, the cooking device can include a handle that may be pulled upward such that the closure pivots upward from an open position to a closed position. Similarly, the handle may be pulled downward to pivot the closure from a closed position to an open position. This arrangement of the closure allows the user's arms and hands to be located away from the opening as the closure is pulled down, thereby reducing concerns of burn hazards resulting from exposure of the hands and/or arms to steam and hot gases escaping from the cooking chamber as the closure is opened.

The handle, if provided, may be attached to various locations of the closure 30. As shown, the handle 40 is attached adjacent a central portion of the front edge 36 although the handle may be attached at other locations of the front edge and/or one or more locations adjacent a portion of the first and second side edge 38a, 38b. As shown in FIG. 2, the handle 40 is oriented adjacent the front portion 14 of the cooking surface when the closure 30 is moved to the first position. As shown in FIG. 1, the handle 40 can also be moved such that the handle is oriented adjacent the an upper portion of the wall structure 20 when the closure 30 is moved to the second position.

Figure 4:
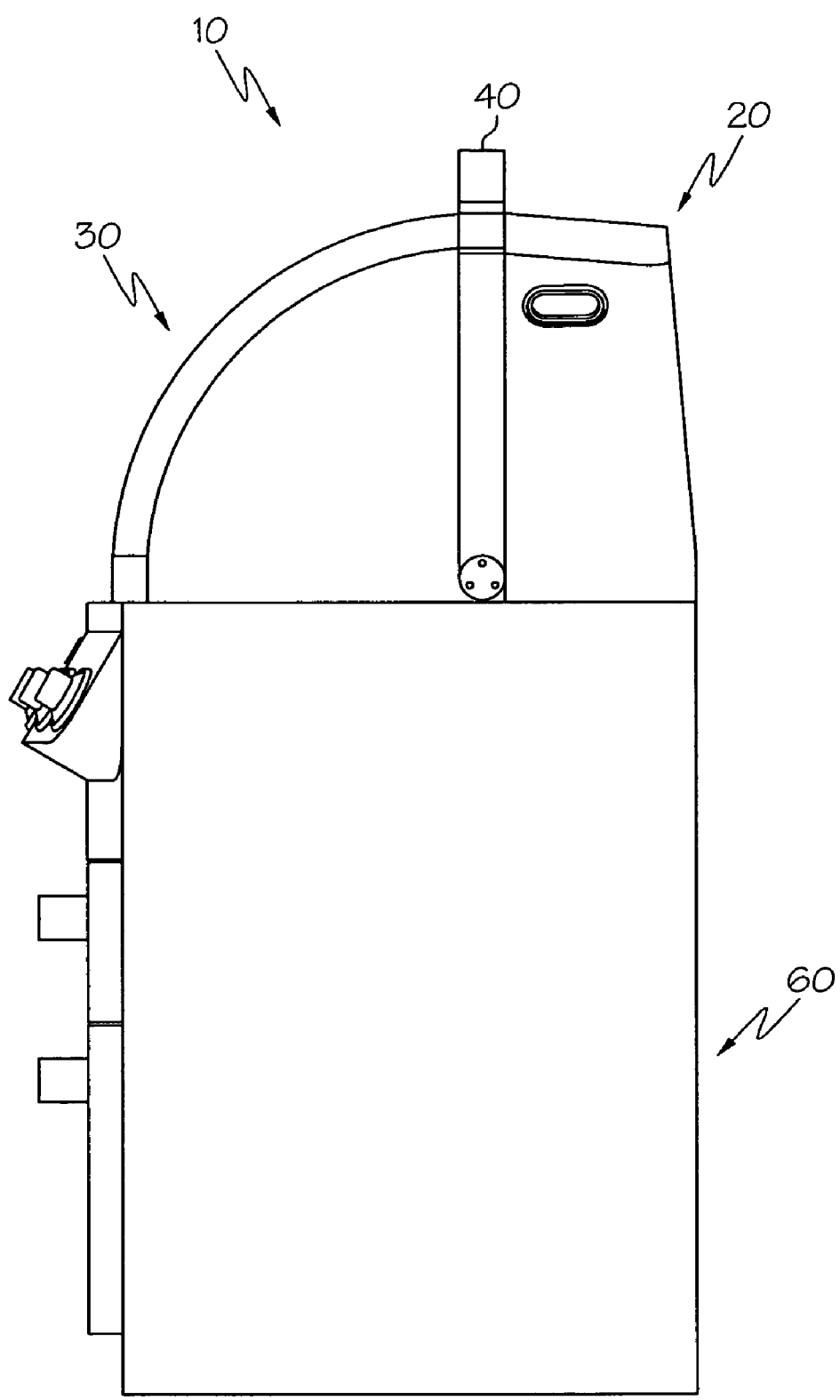
FIG. 4 is a right side elevational view of the cooking device of FIG. 1.
Figure 5:
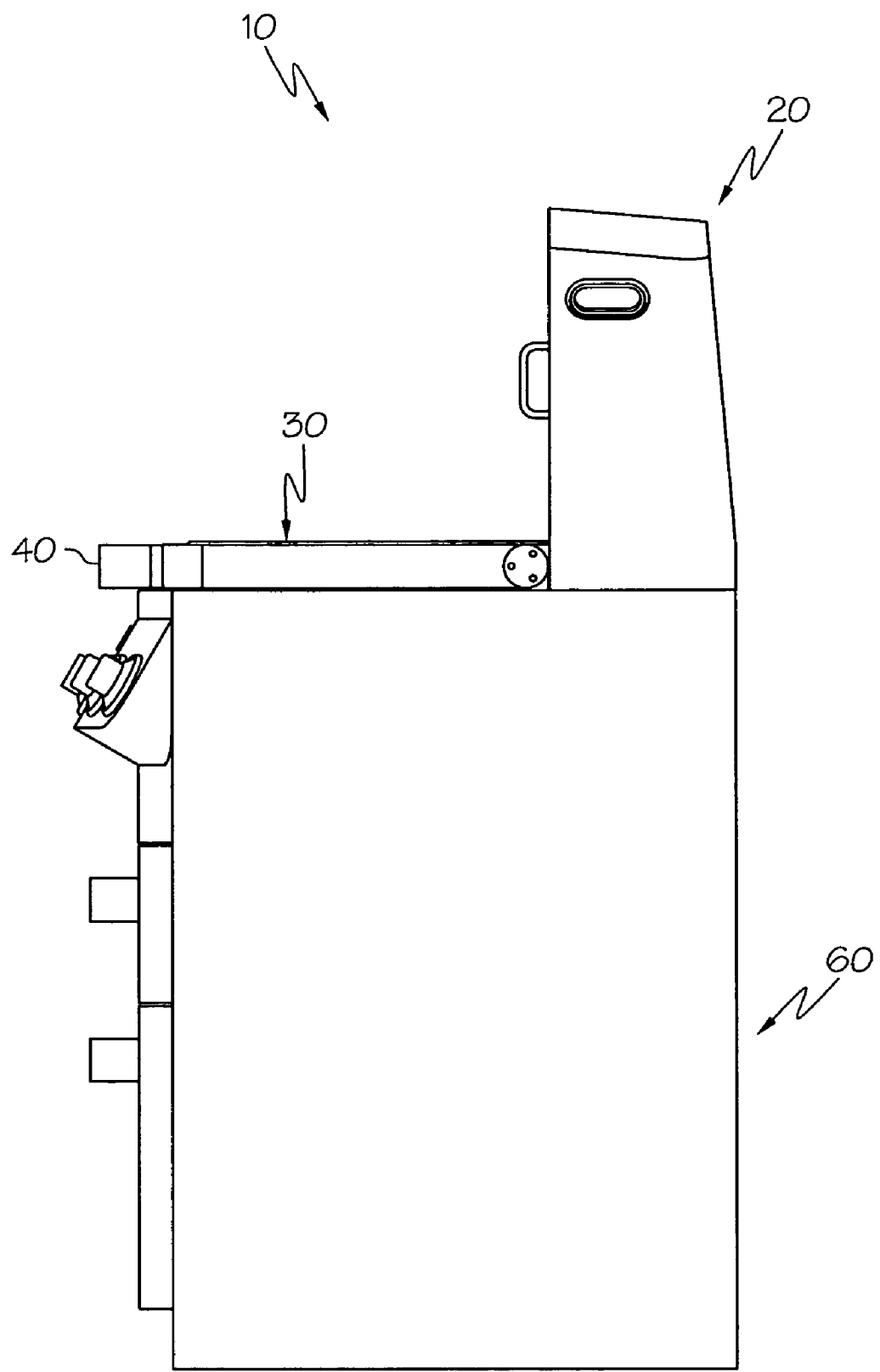
FIG. 5 is a right side elevational view of the cooking device of FIG. 2.

FIG. 4 depicts a right side elevational view of the cooking device 10 with the closure 30 oriented in the second position while FIG. 5 depicts a right side elevational view of the cooking device 10 with the closure 30 oriented in the first position. The right and left side elevational views can be mirror images of one another in example embodiments.

Figure 4A:
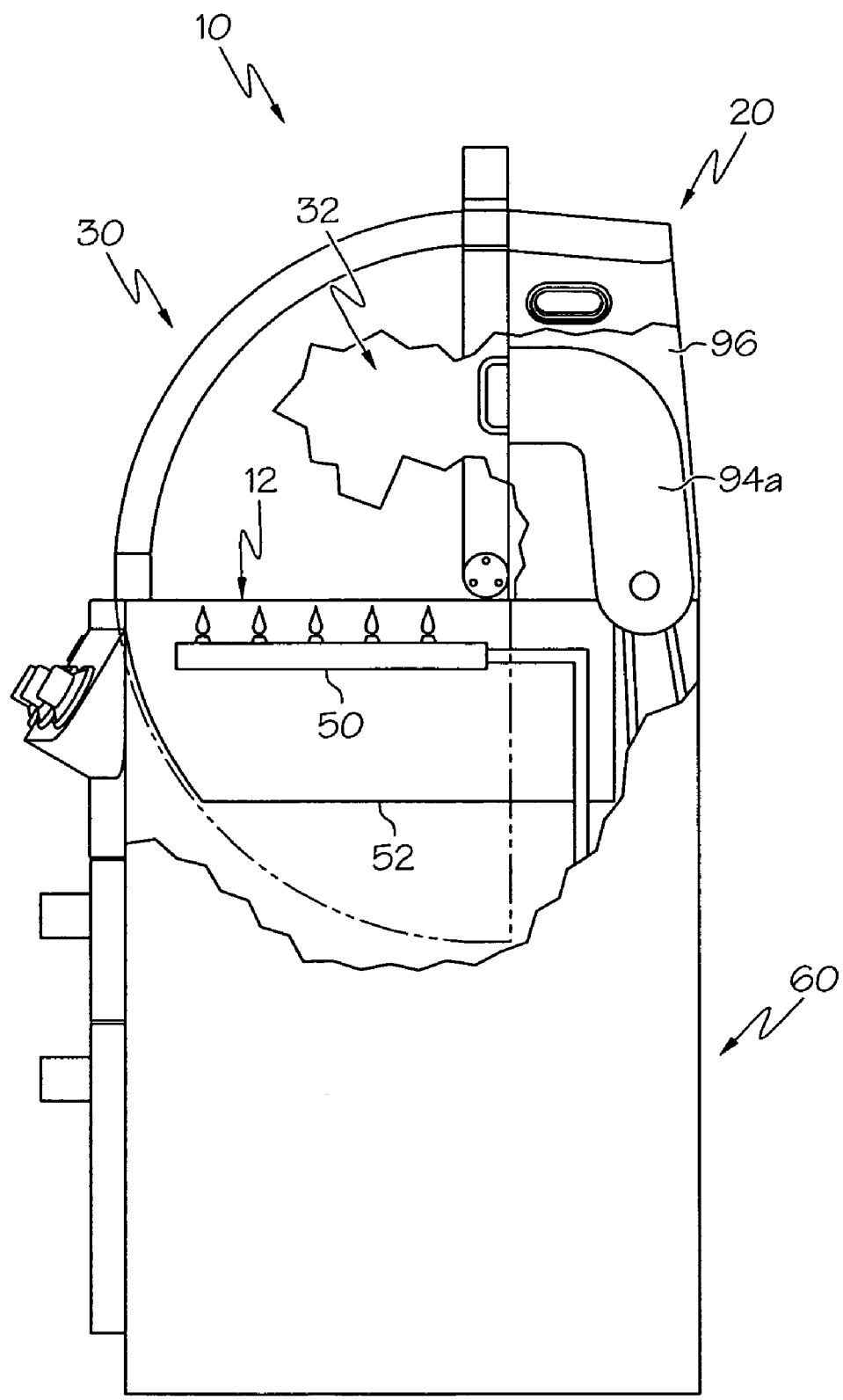
FIG. 4A is a right side elevational view of the cooking device of FIG. 1 with portions of outer walls and a portion of the closure being removed to depict further structures of the cooking device.
Figure 5A:
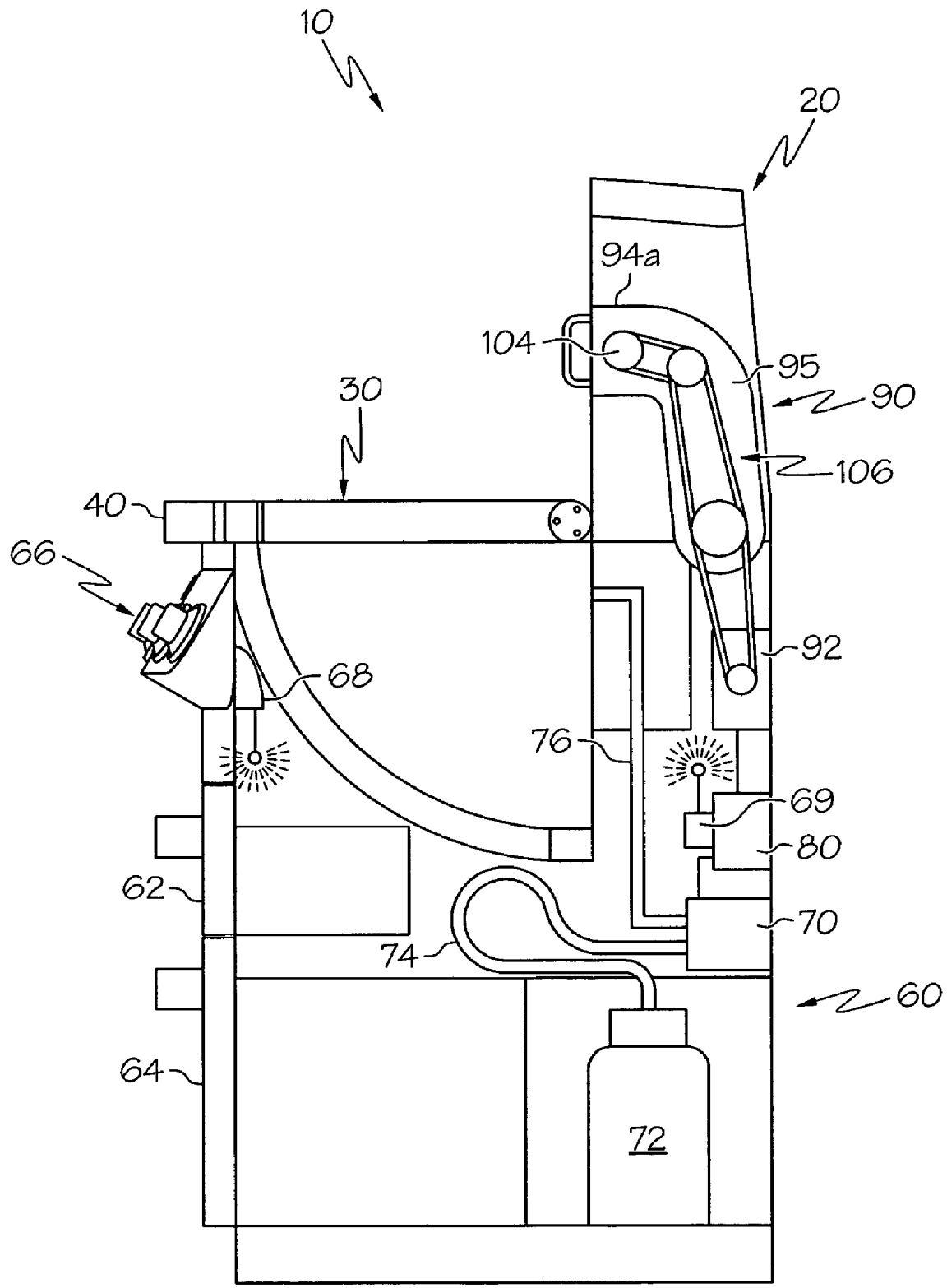
FIG. 5A is a right side elevational view of FIG. 2 with portions of the outer walls being removed to depict further structures of the cooking device.

FIGS. 4A and 5A are right side elevational views of the cooking device 10 with outer portions of the cooking device being removed to schematically depict further structures of the cooking device 10. FIG. 4A depicts the closure in the second position while FIG. 5A depicts the closure in the first position. Referencing FIG. 4A, the cooking device 10 can include a fuel burner 50 positioned within a fire box 52. As shown in FIG. 5A (and in broken lines in FIG. 4A), the closure 30 may be moved such that a portion of the closure 30 extends below the cooking surface 12 and the fire box 52.

As further illustrated, the cooking device 10 can include a support base 60 to accommodate one or more optional drawers 62, 64 and to house components of the cooking device 10. In addition, or alternatively, one or more stoves, ovens, and/or warmer drawers may be incorporated with the cooking device. As shown in FIG. 5A, the support base 60 may include a user control device 66 to control functionality of the cooking device such as temperature, cooking time, rotisserie control and the like. Due to the space requirements by the closure 30, the gas valve manifold 70 and electrical components may be moved to a rear portion of the support base 60. As shown, the lower drawer 64 may include a compartment configured to support a propane tank 72. A gas line 74 is configured to link the propane tank 72 to the gas valve manifold 70 while another gas line 76 may link the valve manifold 70 with the fuel burner 50. The user control device 66 can be linked with wires or wireless technology for communication with a controller 80 configured to send control signals the valve manifold 70 and/or a rotisserie motor 92.

As shown in FIG. 5A, a substantial portion of the closure 30 is concealed by the support base 60 in the first position. As shown in FIG. 2, a substantial portion of the closure 30 is hidden and therefore out of sight from a user. The concealed nature of the closure 30 can reduce clutter, increase work space for a rotisserie unit and present an orderly appearance to the user and others observing the cooking device.

Figure 3:
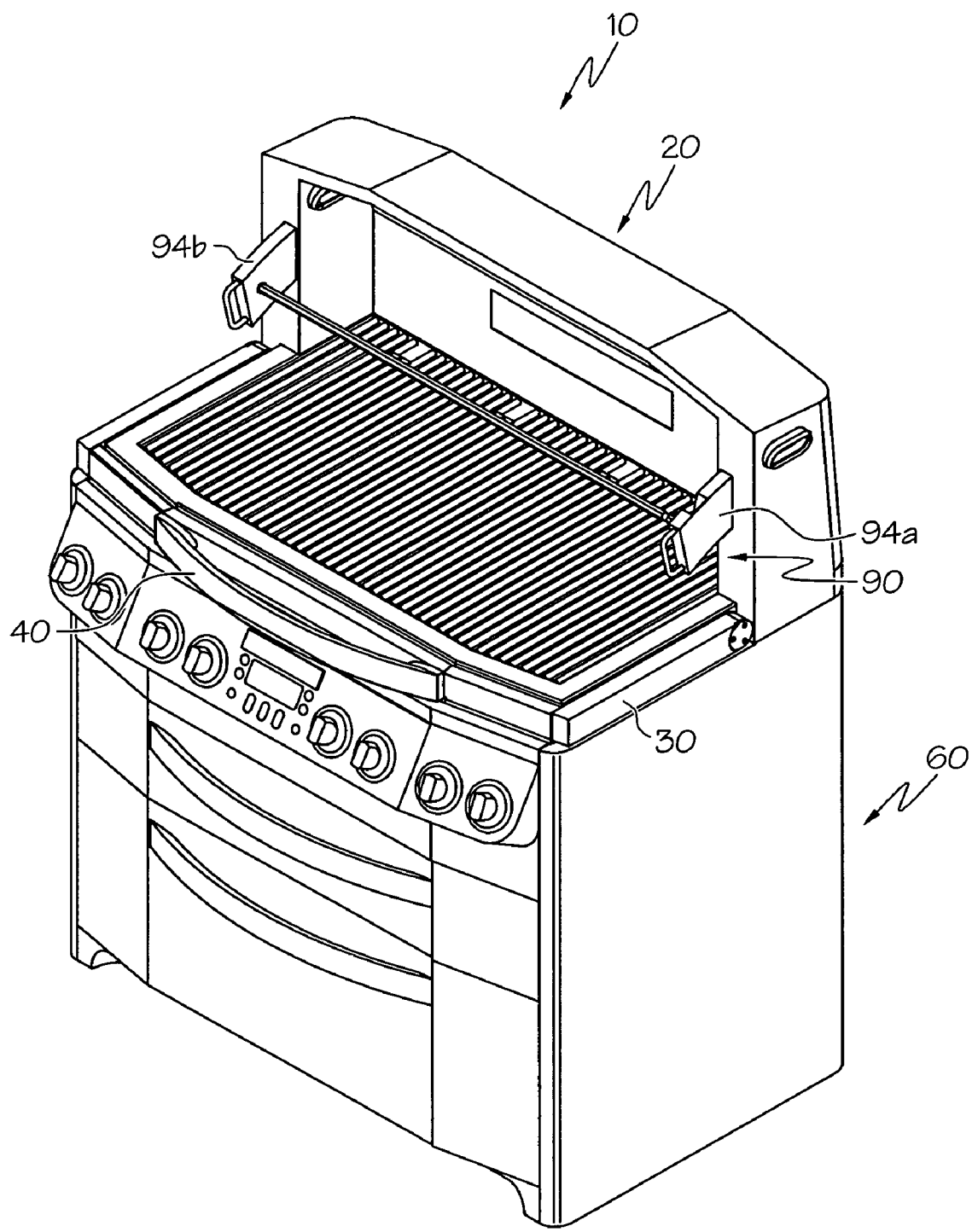
FIG. 3 is a front perspective view of the cooking device of FIG. 1, with the closure oriented in the first position with respect to the wall structure and the two arms of a rotisserie device being oriented in an extended position with respect to the wall structure.

As further illustrated in FIGS. 2 and 3, the cooking device 10 may include a rotisserie device 90 to provide additional cooking and warming functionality. The rotisserie may be configured for various alternative uses. For example, the rotisserie may be provided with a support structure to cook chicken, turkey or the like with the cooking device. In further examples, the rotisserie may be provided with a basket or other support arrangement for grilling vegetables, shellfish, or the like.

Figure 6:
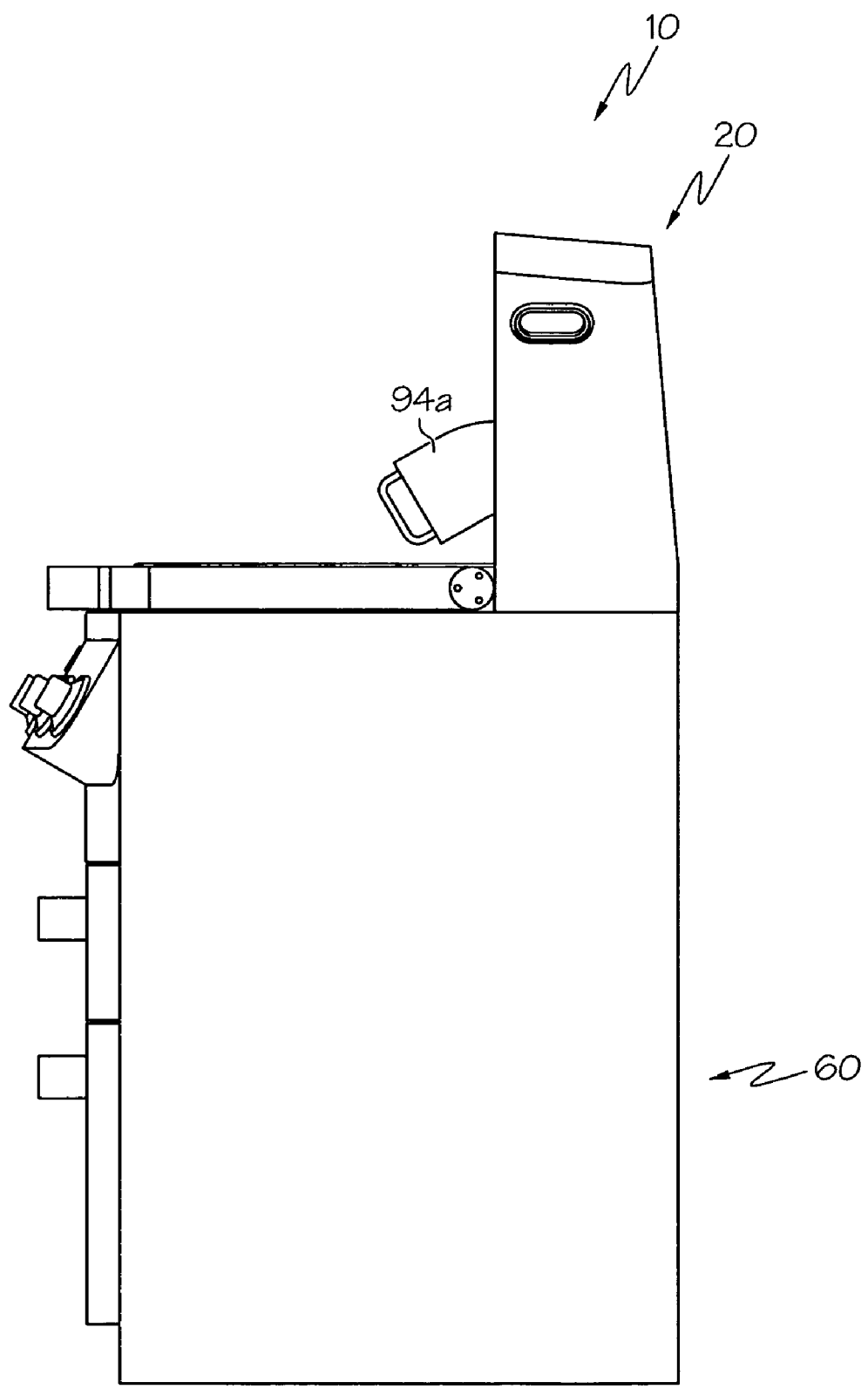
FIG. 6 is a right side elevational view of FIG. 3.
Figure 6A:
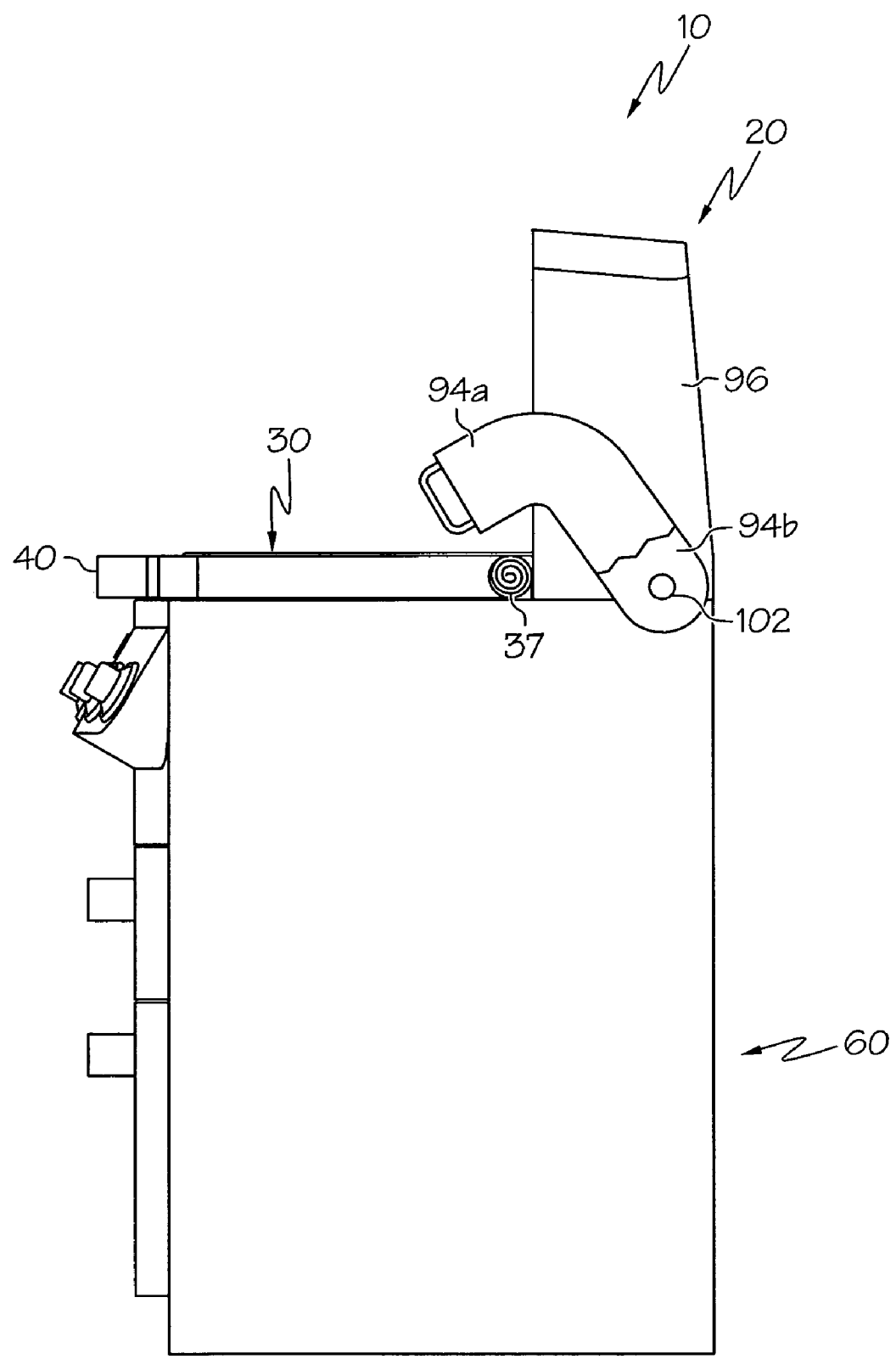
FIG. 6A is a right side elevational view of FIG. 3 with portions of the outer wall and portions of one of the arms of the rotisserie being broken away to depict further structures of the cooking device.

The rotisserie device is shown to include a first arm 94a and a second arm 94b although a single arm may be incorporated in further examples. The arms 94a, 94b are configured to move from a retracted position (see FIG. 2) to an extended position (see FIG. 3) with respect to the wall structure 20. As shown in FIGS. 3, 6 and 6A, a portion of each arm 94a, 94b is configured to extend outside of an interior area portion 96 of the wall structure 20 in the retracted position. As further shown in FIGS. 2, 4A and 5A, the portion of each arm 94a, 94b is configured to positioned within the interior area portion 96 of the wall structure 20 in the retracted position. As will be appreciated by the figures, the interior area portion 96 can be provided by each of the first and second side wall portions 24, 26 of the wall structure 20.

As shown in FIG. 2, each arm 94a, 94b can include an end 98 with a handle 100 attached to the end of the arm. The handles, if provided, can provide for manual movement of the rotisserie device between the extended and retracted positions. Alternatively, deployment of the arms 94a, 94b may be controlled with the user control device 66. As shown in FIG. 2, each end 98 can include a surface that is substantially coplanar with the front surface 24a, 26a of the respective side wall portions 24, 26. Providing the coplanar relationship can remove the rotisserie from view when not in use and can help prevent interference with the operation of the closure in alternative embodiments.

Each arm 94a, 94b of the rotisserie device 90 can move in various ways with respect to the wall structure 20. In the illustrated example, the arms 94a, 94b are configured to pivot relative to the wall structure 20 although nonpivoting relationships may also be provided. Furthermore, the first and second arm may be moved independently from one another or may be configured to move together. For example, as shown in FIG. 6A, the first and second arms 94a, 94b can be connected together by a connecting rod 102 such that movement of one of the first and second arms causes movement of the other of the first and second arms.

As shown in FIG. 5A, the rotisserie device 90 is provided with a support element 104 configured to be rotated by the rotisserie motor 92 by way of a power transmission apparatus 106. The power transmission apparatus 106 can comprise a chain and gear mechanism although a series of pulleys and belts may be provided in further examples. As shown in FIG. 5A, the power transmission apparatus 106 is operably connected to the motor 92 and the support element 104 with at least a portion of the power transmission apparatus being concealed within an interior area 95 of the arms 94a, 94b (see FIG. 5A). Locating at least a portion of the power transmission apparatus within an interior area of each arm can reduce pinch points, protect the power transmission apparatus, and prevent interference with operation of the rotisserie device 90.

In use, an operator can manipulate the user control device 66 to control the function of certain aspects of the cooking device 10. For example, with reference to FIG. 5A, manipulation of controls from the user control device 66 can result in a signal being sent by the wireless communication apparatus 68 and received by the receiver 69. The controller 80 can then send a signal to control operation of the rotisserie motor 92 to cause controlled rotation of the support element 104 of the rotisserie device 90. In addition or alternatively, the controller 80 can send a signal to control operation of the gas valve manifold 70 to control the gas flow rate, oxygen content or other characteristics of fuel traveling to the fuel burner 50.

The user control device 66 discussed above may bring together certain functions to provide enhanced information to the operator of the cooking device 10. For example, the user control device 66 can display total cook time and total time remaining to cook to provide alternative information. In order to provide further information and distinguish between these functions, one of the total cook time or total time remaining could be displayed as an analog format while the other may be displayed in a digital format. In further embodiments, it is contemplated that both may be displayed in digital or both may be displayed in analog. If shown in analog, the information may be displayed as a digital clock wherein the total cook time and/or the total time remaining may be displayed as a portion of a pie representing the relative portion compared to the total. Further functions might include a temperature reading. In exemplary embodiments, grayed areas may be used to represent temperature readings such as vertical bar representing a digital thermometer or might simply comprise a digital read-out of the actual temperature in degrees Fahrenheit and/or degrees Celsius.

In order to prevent theft, one or more access compartments of the cooking device discussed throughout this application may include a key, combination or other locking mechanism adapted to inhibit, such as prevent, unauthorized access to the compartments. Such a locking feature may be useful in instances where the cooking device is left unattended for a period of hours, days, weeks (or other longer or shorter periods of time) where there is a desire to prevent unauthorized access.

From the above description of the invention, those skilled in the art will perceive improvements, changes and modifications. Such improvements, changes and modifications within the skill of the art are intended to be covered by the appended claims.

What is claimed:

1. A cooking device comprising: a cooking surface including a front portion and a rear portion; a wall structure extending away with respect to the rear portion of the cooking surface; a closure configured to be moved with respect to the wall structure from a first position to a second position, wherein access to the cooking surface is provided when the closure is oriented in the first position and the closure is configured to cooperate with the wall structure to define a cooking chamber when the closure is oriented in the second position; and a handle attached to the closure, wherein the closure is configured to move from the second position to the first position by moving the handle in a downward direction and away with respect to the wall structure.

2. The cooking device of claim 1, wherein the closure is configured to pivot about a pivot axis between the first position and the second position.

3. The cooking device of claim 1, wherein the closure is provided with a counterbalance device.

4. A cooking device comprising: a cooking surface including a front portion and a rear portion; a wall structure extending away with respect to the rear portion of the cooking surface; a closure configured to be moved with respect to the wall structure from a first position to a second position, wherein access to the cooking surface is provided when the closure is oriented in the first position and the closure is configured to cooperate with the wall structure to define a cooking chamber when the closure is oriented in the second position; and a handle attached to the closure, wherein the closure is configured to move from the second position to the first position by moving the handle away with respect to the wall structure, wherein a substantial portion of the closure is concealed by the support base in the first position.

5. The cooking device of claim 1, wherein a portion of the closure is configured to extend below the cooking surface when the closure oriented in the first position.

6. The cooking device of claim 1, wherein the handle is oriented adjacent the front portion of the cooking surface when the closure is moved to the first position and oriented adjacent an upper portion of the wall structure when the closure is moved to the second position.

7. The cooking device of claim 1, further comprising a user control device configured to adjust a cooking temperature, wherein the user control device includes a wireless communication apparatus.

8. A cooking device comprising: a cooking surface including a front portion and a rear portion; a wall structure extending away with respect to the rear portion of the cooking surface; a closure configured to be moved with respect to the wall structure from a first position to a second position, wherein access to the cooking surface is provided when the closure is oriented in the first position and the closure is configured to cooperate with the wall structure to define a cooking chamber when the closure is oriented in the second position; and a handle attached to the closure, wherein the closure is configured to move from the second position to the first position by moving the handle away with respect to the wall structure, further comprising a rotisserie device including an arm configured to move from a retracted position to an extended position with respect to the wall structure, wherein a portion of the arm is positioned within an interior area of the wall structure in the retracted position and wherein the portion of the arm extends outside of the interior area of the wall structure in the extended position.

9. A cooking device comprising: a cooking surface including a front portion and a rear portion; a wall structure extending away with respect to the cooking surface; a rotisserie device including an arm configured to move from a retracted position to an extended position with respect to the wall structure, wherein a portion of the arm is positioned within an interior area portion of the wall structure in the retracted position and wherein the portion of the arm extends outside of the interior area portion of the wall structure in the extended position.

10. The cooking device of claim 9, wherein the arm includes an end with a handle attached to the end of the arm.

11. The cooking device of claim 9, wherein the arm includes an end including a surface that is substantially coplanar with a surface of the wall structure when the arm is oriented in the retracted position.

12. The cooking device of claim 9, wherein the arm is configured to pivot with respect to the wall structure between the refracted and extended positions.

13. The cooking device of claim 9, wherein the rotisserie device includes a second arm configured to move from a second retracted position to a second extended position with respect to the wall structure, wherein a portion of the second arm is positioned within a second interior area portion of the wall structure in the second retracted position and wherein the portion of the second arm extends outside of the second interior area portion of the wall structure in the second extended position.

14. The cooking device of claim 13, wherein the first and second arm are coupled together such that movement of one of the first and second arms causes movement of the other of the first and second arms.

15. The cooking device of claim 9, wherein the rotisserie device includes a motor and the arm includes a support element configured to be rotated by the motor.

16. The cooking device of claim 15, wherein the rotisserie device includes a power transmission apparatus operably connected to the motor and the support element with at least a portion of the power transmission apparatus being concealed within an interior area of the arm.

17. The cooking device of claim 9, further comprising a closure configured to be moved with respect to the wall structure from a first position to a second position, wherein access to the cooking surface is provided when the closure is oriented in the first position and the closure is configured to cooperate with the wall structure to define a cooking chamber when the closure is oriented in the second position; and a handle attached to the closure, wherein the closure is configured to move from the second position to the first position by moving the handle away with respect to an upper portion of the wall structure, wherein the handle is oriented adjacent the front portion of the cooking surface when the closure is moved to the first position and oriented adjacent the upper portion of the wall structure when the closure is moved to the second position.

18. A cooking device comprising: a cooking surface including a front portion and a rear portion; a wall structure extending away with respect to the rear portion of the cooking surface; a support base configured to support the wall structure and cooking surface; a closure configured to be moved with respect to the wall structure from a first position to a second position, wherein access to the cooking surface is provided when the closure is oriented in the first position and the closure is configured to cooperate with the wall structure to define a cooking chamber when the closure is oriented in the second position, wherein the closure is configured to move from the second position to the first position by moving an edge of the closure away with respect to an upper portion of the wall structure; and a rotisserie device including an arm configured to move from a retracted position to an extended position with respect to the wall structure, wherein a portion of the arm is positioned within an interior area portion of the wall structure in the retracted position and wherein the portion of the arm extends outside of the interior area portion of the wall structure in the extended position.

19. The cooking device of claim 18, further comprising a handle attached to the closure, wherein the closure is configured to move from the second position to the first position by moving the handle away with respect to an upper portion of the wall structure.

20. The cooking device of claim 18, wherein the arm includes a rotatable support element and the rotisserie device includes a motor and a power transmission apparatus operably connected to the rotatable support element and the motor, wherein at least a portion of the power transmission apparatus is concealed within an interior area of the arm.

* * * * *